US009648701B1

(12) United States Patent
Maricic et al.

(10) Patent No.: US 9,648,701 B1
(45) Date of Patent: May 9, 2017

(54) MULTI-FUNCTIONAL OPTICAL SENSOR FOR INDOOR LIGHTING SYSTEMS

(71) Applicant: General Electric Company, Schenectady, NY (US)

(72) Inventors: Danijel Maricic, Niskayuna, NY (US); Michael James Hartman, Niskayuna, NY (US); Stanislava Soro, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/986,022

(22) Filed: Dec. 31, 2015

(51) Int. Cl.
*H05B 37/02* (2006.01)
*F21V 23/04* (2006.01)
*H05B 33/08* (2006.01)
*F21Y 115/10* (2016.01)

(52) U.S. Cl.
CPC ..... *H05B 37/0218* (2013.01); *F21V 23/0464* (2013.01); *F21V 23/0471* (2013.01); *H05B 33/0854* (2013.01); *H05B 37/0227* (2013.01); *H05B 37/0272* (2013.01); *F21Y 2115/10* (2016.08)

(58) Field of Classification Search
CPC .................................. H05B 33/0854
USPC ......................... 315/149; 340/540
See application file for complete search history.

(56) References Cited

U.S. PATENT DOCUMENTS

| 5,834,765 | A | 11/1998 | Ashdown | |
| 8,107,825 | B2 | 1/2012 | Rajagopal et al. | |
| 8,436,748 | B2 | 5/2013 | Mimeault et al. | |
| 8,475,002 | B2 | 7/2013 | Maxik et al. | |
| 8,521,035 | B2 | 8/2013 | Knapp et al. | |
| 8,975,827 | B2 * | 3/2015 | Chobot | H05B 37/02 315/291 |
| 8,977,371 | B2 | 3/2015 | Ashdown | |
| 9,155,165 | B2 * | 10/2015 | Chobot | H05B 37/029 |
| 9,433,061 | B2 * | 8/2016 | Chobot | H05B 37/029 |
| 2012/0321321 | A1 | 12/2012 | Riesebosch | |
| 2015/0015145 | A1 * | 1/2015 | Carrigan | H05B 37/0272 315/131 |
| 2017/0026119 | A1 * | 1/2017 | Raj | H04L 67/12 |

FOREIGN PATENT DOCUMENTS

CN 102164436 A 8/2011
WO 2014154023 A1 10/2014

OTHER PUBLICATIONS

Zhao et al., "A dimmable LED driver for visible light communication (VLC) based on LLC resonant DC-DC converter operating in burst mode", Applied Power Electronics Conference and Exposition (APEC), 2013 Twenty-Eighth Annual IEEE, pp. 2144-2150, Mar. 17-21, 2013, Long Beach, CA.

* cited by examiner

*Primary Examiner* — Thuy Vinh Tran
(74) *Attorney, Agent, or Firm* — Nitin N. Joshi

(57) ABSTRACT

An electronic device includes a multi-functional optical sensor configured to couple to one or more light sources within a space. The multi-functional optical sensor is configured to detect occupancy of the space, ambient light within the space, and visible light communication (VLC) signals optically communicated in the space.

18 Claims, 2 Drawing Sheets

MULTI-FUNCTIONAL OPTICAL SENSOR FOR INDOOR LIGHTING SYSTEMS

BACKGROUND OF THE INVENTION

The subject matter disclosed herein relates to indoor lighting systems and, more specifically, to a multi-functional optical sensor for indoor lighting systems.

Certain indoor lighting system sensors may be provided for sensing and controlling various conditions and parameters of the indoor lighting systems. However, each sensor may function to measure only a single parameter or condition of the indoor lighting system, and thus an inordinate number of sensors may be deployed within a single indoor lighting system. Such scenarios may contribute to unnecessary system complexity, and, further, with such a large number of varying sensors coupling to the indoor lighting system, may contribute to otherwise avoidable electrical faults and/or other indoor lighting system inefficiencies. It may be useful to provide improved sensors for indoor lighting systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an electronic device includes a multi-functional optical sensor configured to couple to one or more light sources within a space. The multi-functional optical sensor is configured to detect occupancy of the space, ambient light within the space, and visible light communication (VLC) signals optically communicated in the space.

In a second embodiment, a non-transitory computer-readable medium includes code with instructions to cause a multi-functional optical sensor to detect light within a defined space, cause the multi-functional optical sensor to compute an averaged phase delay of the detected light with respect to a pulsed light time of flight (TOF) measurement, cause the multi-functional optical sensor to synchronize the pulsed light of a light source of a plurality of light sources commutatively coupled to the multi-functional optical sensor with scheduled pulse periods of the plurality of light sources. The light source is in close proximately to the multi-functional sensor. The code includes instructions to cause the multi-functional optical sensor to measure occupancy of the defined space, ambient light within the defined space, and visible light communication (VLC) signals optically communicated within the defined space according to the scheduled time slots.

In a third embodiment, a system includes a light source configured to illuminate an indoor space and an optical sensor coupled to the light source. The optical sensor is configured to detect occupancy of the indoor space, ambient light within the indoor space, and visible light communication (VLC) signals optically communicated in the indoor space.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a multi-functional optical sensor for an indoor facility (e.g., residential and/or commercial building) that may be used to function as an occupancy sensor, an ambient light sensor, and a visible light communication (VLC) receiver and/or transmitter. In certain embodiments, the multi-functional optical sensor may include a photosensor and may be coupled to, and configured to operate in conjunction with one or more light sources (e.g., lamps or other light fixtures) that may be included within the indoor facility. In certain embodiments, the multi-functional optical sensor may be synchronized with light pulses generated by the one or more light sources, and light luminance may be measured by averaging the light pulses over time to perform the occupancy sensing, ambient light sensing, and VLC sensing functionalities. Indeed, in certain embodiments, the occupancy sensing functionality, ambient light sensing functionality, and the VLC sensing functionality of the multi-functional optical sensor may be each based on light signal measurements detected according to scheduled time slots. Furthermore, in one embodiment, the multi-functional optical sensor may automatically switch between the occupancy sensing functionality, the ambient light sensing functionality, and the VLC sensing functionality. In this way, the multi-functional optical sensor may significantly improve efficiency and cost-effectiveness, and further the complexity of the multi-functional optical sensor may be markedly reduced.

Figure 1:
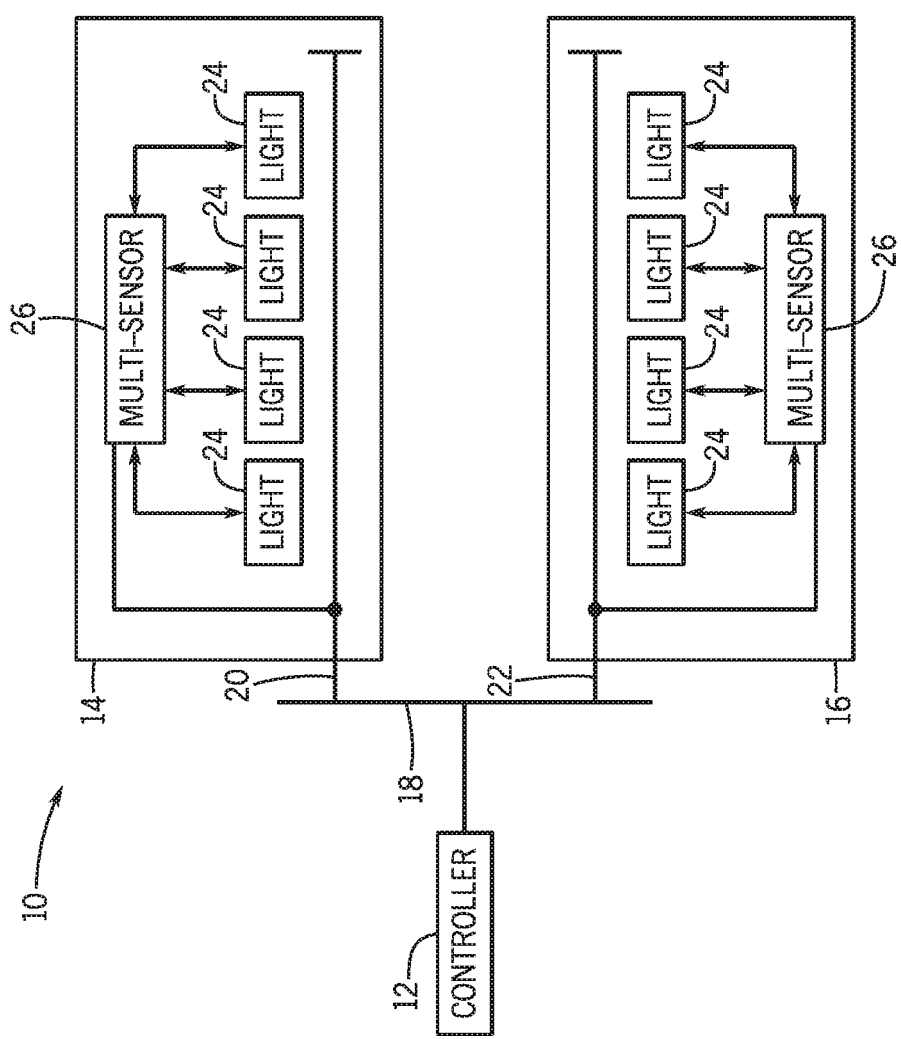
FIG. 1 is a block diagram of a power and lighting control system, in accordance with an embodiment.

With the foregoing in mind, FIG. 1 is a block diagram of a power and lighting system 10 that may be included, for example, in a residential building, a commercial building, and/or other indoor facility. As depicted, the power and lighting system 10 may include a central controller 12 that may be used to control the power and lighting system 10, and, more specifically, the lighting in one more rooms or spaces 14 and 16 of, for example, an indoor facility. Indeed, as further depicted in FIG. 1, the controller 12 may control power to the rooms or spaces 14 and 16 via a power bus 18 (e.g., alternating current [AC] power bus) and conductors 20 and 22 (e.g., electrical wiring).

For example, the controller 12 may provide the power via the conductors 20 and 22 to power the individual light sources 24 of the rooms or spaces 14 and 16. In certain embodiments, the light sources 24 may include, for example, a number of light-emitting diodes (LEDs) and lighting devices (e.g., LED lamps). Furthermore, in some embodiments, in addition to the conductors 20 and 22 (e.g., electrical wiring) powering the light sources 24, the conductors 20 and 22 (e.g., electrical wiring) may be used as a medium for two-way communication (e.g., power-line communication [PLC]) between, for example, the controller 12 and the individual light sources 24 and/or communication between the light sources 24 of the rooms or spaces 14 and 16.

In certain embodiments, as further depicted, the rooms or spaces 14 and 16 may also include multi-functional optical sensors 26 that may be communicatively coupled (e.g., wired and/or wirelessly) to the light sources 24 and the controller 12. In one embodiment, the multi-functional optical sensors 26 may be incorporated as part of the light sources 24, or, in other embodiments, the multi-functional optical sensors 26 may include one or more standalone devices, as depicted. For example, in some embodiments, the multi-functional optical sensors 26 may each be enclosed inside, for example, respective finished enclosures, such that the multi-functional optical sensors 26 may be wall-mounted and placed within the rooms or spaces 14 and 16. In another embodiment, the multi-functional optical sensors 26 may be included as part of the controller 12.

Figure 3:
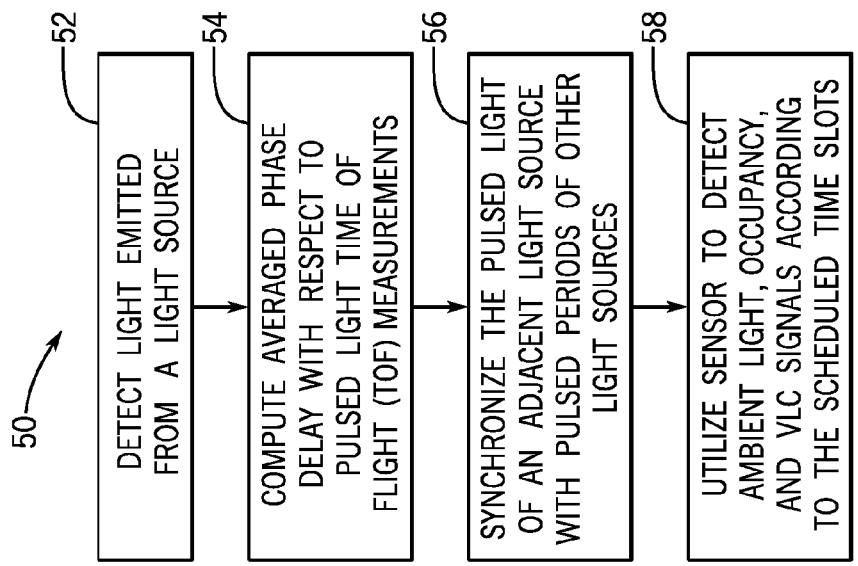
FIG. 3 is a flowchart illustrating an embodiment of a process suitable for utilizing the sensor of FIG. 2 to detect ambient light, occupation, and visible light communication (VLC) signals, in accordance with present embodiments.
Figure 2:
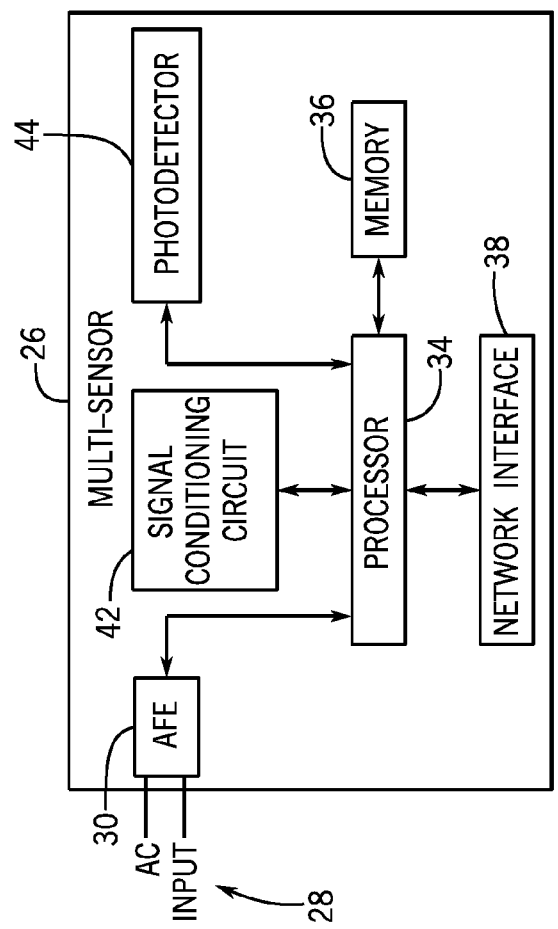
FIG. 2 is a schematic diagram of an embodiment of a multi-functional optical sensor, in accordance with an embodiment.

As will be further appreciated with respect to FIGS. 2 and 3, the multi-functional optical sensors 26 may include occupancy sensing functionality (e.g., sensing the presence of a human or other disturbance within the rooms or spaces 14 and 16), ambient light sensing functionality (e.g., sensing the human eye response to light under lighting environments or conditions ranging from low-light to bright sunlight for the purpose of reducing power consumption), and visible light communication (VLC). Indeed, the multi-functional optical sensor 26 may include a singular unit that may function as the aforementioned occupancy sensor, ambient light sensor, and VLC receiver and/or transmitter. For example, in one embodiment, the multi-functional optical sensor 26 may automatically switch between the occupancy sensing functionality, the ambient light sensing functionality, and the VLC sensing functionality. In this way, the multi-functional optical sensor 26 may significantly improve efficiency and cost-effectiveness, and further the complexity of the multi-functional optical sensor 26 may be markedly reduced.

Turning now to FIG. 2, a schematic diagram of an embodiment of the multi-functional optical sensor 26 is illustrated. As depicted, the multi-functional optical sensor 26 may receive an AC input 28 that may be provided to an analog front end (AFE) circuitry 30. The AFE circuitry 30 may, for example, in time intervals or in real time, sample single or poly-phase current (A) and voltage (V) of the AC input 28. The AFE 30 may then provide a digital signal to a processor 34. The processor 34 may be operatively coupled to a memory device 36 to execute instructions for carrying out the presently disclosed techniques. These instructions may be encoded in programs or code stored in a tangible non-transitory computer-readable medium, such as the memory device 36 of the multi-functional optical sensor 26 and/or other storage. The processor 34 may be a general-purpose processor, a multi-core processor, a digit signal processor (DSP), a system-on-chip (SoC) device, an application-specific integrated circuit (ASIC), or some other similar processor configuration.

As further illustrated, the multi-functional optical sensor 26 may also include a network interface 38 that may be communicatively coupled to the processor 34, and may be used to allow the multi-functional optical sensor 26 to communicate (e.g., wirelessly) with, for example, the light sources 24 and/or the controller 12. For example, the network interface 26 may include interfaces for a personal area network (PAN), such as a Bluetooth® network, for a local area network (LAN) or wireless local area network (WLAN), such as an 802.11x Wi-Fi network, and/or for a wide area network (WAN), such as a $3^{rd}$ generation (3G) cellular network, $4^{th}$ or $5^{th}$ generation (4G, 5G) cellular network, or long term evolution (LTE) cellular network, and so forth.

In certain embodiments, as previously discussed above with respect to FIG. 1, the multi-functional optical sensor 26 may also include signal conditioning circuitry 42 and photodetector 44 that may all be integrated as part of the multi-functional optical sensor 26 to allow the multi-functional optical sensor 26 to function as an occupancy sensor, ambient light sensor, and VLC receiver and/or transmitter. In certain embodiments, the photodetector 44 may operate to detect, for example, occupancy (e.g., sensing the presence of a human or other disturbance) and ambient light (e.g., sensing light under various lighting and natural lighting environments or conditions).

For example, the photodetector 44 may be based on, for example, one or more photosensors, and may sample (e.g., in conjunction with the processor 34) light pulses (e.g., imperceptible light pulses) produced by the light sources 24. Indeed, in one embodiment, the photodetector 44 may sample light pulses produced by the light sources 24 synchronously with the light modulation of the light produced by the light sources 24. The light measurement detected via the photosensor used for the photodetector 44 may be used by a photodetector 44 to measure the average light detected, or more aptly, an average luminance of the light detected. The averaged light measured by the photodetector 44 may be an indication of the ambient light of the rooms or spaces 14 and 16. The averaged light measurement may be synchronized with a single light source 24 and/or multiple light sources 24. In some embodiments, the averaged light measurement may be performed for an imperceptibly brief period of time when an adjacent light source 24 is turned off, or when multiple light sources 24 in the rooms or spaces 14 and 16 are turned off (e.g., not emitting), such that the ambient light measurement may include the luminance of all the light sources 24 other than the light source 24 closest to the multi-functional optical sensor 26. In another embodiment, the ambient light measurement may include the luminance of all the light sources 24 other than any sunlight (e.g., natural light).

In some embodiments, the photodetector 44 may filter (e.g., low pass filter frequencies up to approximately 10 hertz [Hz]) to remove, for example, power line frequency artifacts that may be present, for example, power conductors 20 and 22. In certain embodiments, the same detected light signal may be measured by the signal conditioning circuitry 42 at a higher rate to allow the multi-functional optical sensor 26 to detect a VLC signal. Specifically, as previously discussed above, the signal conditioning circuitry 42 may allow the multi-functional optical sensor 26 to function as an optical receiver for VLC in addition to functioning as an occupancy sensor and ambient light sensor. For example, in certain embodiments, the signal conditioning circuitry 42 (e.g., in conjunction with the processor 34) may sample the detected light signal at a sufficient rate to measure the time of flight (TOF) (e.g., the time that it takes for light energy to travel a distance through a medium such as free space) when the light pulses produced by the light sources 24 are synchronized with the sampling time. The signal conditioning circuitry 42 may detect this change in visible light as an indication of a VLC communication signal in the frequency range of, for example, 120 Hz to 1 gigahertz (GHz) using one or more modulation schemes.

In certain embodiments, the occupancy sensing functionality, ambient light sensing functionality, and the VLC sensing functionality of the multi-functional optical sensor 26 may be each based on light signal measurements detected according to scheduled time slots. In some embodiments, the VLC sensing functionality of the multi-functional optical sensor 26 may be scheduled such that the VLC sensing functionality is synchronized with the operation of one or more nearby or adjacent light sources 24 in order to prevent the VLC communication channel collisions (e.g., due to reduced sensitivity or sensor saturation). It should be appreciated that the VLC sensing functionality of the multi-functional optical sensor 26 may operate with the light sources 24 or with other sources of VLC communication.

For example, in other embodiments, the associated light source may be one or more VLC transmitters (e.g., smartphones or tablet computers that may be carried by one or more inhabitants of the rooms or spaces 14 and 16). In such a case, the signal conditioning circuitry 42 (e.g., in conjunction with the processor 34) may schedule the communication between multiple VLC transmitters according to time and/or at different frequencies. For example, the synchronization of the detected light pulses may be based on light pulse sequences and/or radio frequency (RF) energy. In another embodiment, the communication between different light sources 24 may be scheduled over different networks. For example, light pulses produced by a first light source 24 may be scheduled over an RF network and/or channel while a different one of the light sources 24 may be scheduled over, for example, a Digital Addressable Lighting Interface (DALI) network and/or channel.

As another example, the scheduled time slots may be used among a group of light sources 24 that are communicatively coupled (e.g., via RF or wired communications). These time slots may be used to increase sensitivity of the TOF in which a group of light sources 24 in the rooms or spaces 14 and 16 and/or part of the rooms or spaces 14 and 16 may be synchronously all turned off and only the light source 24 adjacent to, or most closest to the multi-functional sensor 26 may be pulsed. Thus, the accuracy of the TOF based presence sensing may be increased. In another embodiment, the scheduled time slots may be used to turn off all the light sources 24 such that only one of the light sources 24 may be transmitting data through modulated light VLC. In this way, one or more multi-functional optical sensors in the rooms or spaces 14 and 16 may receive VLC data. In other embodiments, as an alternative to scheduling, the signal conditioning circuitry 42 (e.g., in conjunction with the processor 34) may detect visible light transmission occurring only after the multi-functional optical sensor 26 does not detect modulated light in, for example, a desired frequency range (e.g., via carrier sense multiple access [CSMA], orthogonal frequency division multiplexing [OFDM], and so forth).

Turning now to FIG. 3, a flow diagram is presented, illustrating an embodiment of a process 50 useful in detecting ambient light, occupancy, and visible light communication (VLC) signals by using, for example, the singular multi-functional optical sensor 26 illustrated in FIG. 2. The process 50 may include code or instructions stored in a non-transitory machine-readable medium (e.g., the memory device 36) and executed, for example, by the processor 34 in conjunction with the signal conditioning circuitry 42 and the photodetector 44 included in the multi-functional optical sensor 26. The process 50 may begin with the multi-functional optical sensor 26 detecting (block 52) light emitted from a light source (e.g., light sources 24).

The process 50 may then continue with the multi-functional optical sensor 26 computing (block 54) an averaged phase delay (e.g., time delay) with respect to pulsed light time of flight (TOF) measurements associated with detected light or VLC signal. The process 50 may then continue with the multi-functional optical sensor 26 synchronizing (block 56) the pulsed light of an adjacent light source with pulsed periods of other light sources. The process 50 may then conclude with the multi-functional optical sensor 26 detecting (block 58) and determining ambient light, occupancy, and VLC signals. Thus, because the multi-functional optical sensor 26 may include occupancy sensing functionality, ambient light sensing functionality, and VLC sensing functionality, the multi-functional optical sensor 26 may significantly improve efficiency and cost-effectiveness, and further the complexity of the multi-functional optical sensor 26 may be markedly reduced.

Technical effects of present embodiments relate to a multi-functional optical sensor for an indoor facility (e.g., residential and/or commercial building) that may be used to function as an occupancy sensor, an ambient light sensor, and a visible light communication (VLC) receiver and/or transmitter. In certain embodiments, the multi-functional optical sensor may include a photosensor and may be coupled to, and configured to operate in conjunction with one or more light sources (e.g., lamps or other light fixtures) that may be included within the indoor facility. In certain embodiments, the multi-functional optical sensor may be synchronized with light pulses generated by the one or more light sources, and light luminance may be measured by averaging the light pulses over time to perform the occupancy sensing, ambient light sensing, and VLC sensing functionalities. Indeed, in certain embodiments, the occupancy sensing functionality, ambient light sensing functionality, and the VLC sensing functionality of the multi-functional optical sensor may be each based on light signal measurements detected according to scheduled time slots. Furthermore, in one embodiment, the multi-functional optical sensor may automatically switch between the occupancy sensing functionality, the ambient light sensing functionality, and the VLC sensing functionality. In another embodiment, the multi-functional optical sensor may perform the occupancy sensing functionality, the ambient light sensing functionality, and the VLC sensing functionality concurrently. In this way, the multi-functional optical sensor may significantly improve efficiency and cost-effectiveness, and further the complexity of the multi-functional optical sensor may be markedly reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device, comprising:
a multi-functional optical sensor configured to couple to one or more light sources within a space, wherein the multi-functional optical sensor comprises:
a photodetector configured to detect occupancy of the space and ambient light within the space; and
signal conditioning circuitry configured to detect visible light communication (VLC) signals optically communicated in the space,
wherein the multi-functional optical sensor is configured to switch between detecting the occupancy of the space, the ambient light within the space, and the VLC signals.

2. The electronic device of claim 1, wherein the photodetector of the multi-functional optical sensor is configured to detect the occupancy of the space based at least in part on light emitted by the one or more light sources.

3. The electronic device of claim 2, wherein the photodetector of the multi-functional optical sensor is configured to detect the occupancy of the space based at least in part on a time of flight (TOF) of the light emitted by the one or more light sources.

4. The electronic device of claim 1, wherein the photodetector of the multi-functional optical sensor is configured to detect the ambient light within the space based at least in part on light emitted by the one or more light sources.

5. The electronic device of claim 4, wherein the photodetector of the multi-functional optical sensor is configured to detect the ambient light within the space by averaging a signal comprising a luminance of the light emitted by the one or more light sources over time.

6. The electronic device of claim 1, wherein the multi-functional optical sensor comprises a standalone multi-functional optical sensor.

7. An electronic device, comprising:
a multi-functional optical sensor configured to couple to one or more light sources within a space, wherein the multi-functional optical sensor comprises:
a photodetector configured to detect occupancy of the space and ambient light within the space; and
signal conditioning circuitry configured to detect visible light communication (VLC) signals optically communicated in the space, wherein the signal conditioning circuitry of the multi-functional optical sensor is configured to detect the VLC signals based at least in part on measurements of the light detected in one or more scheduled time slots.

8. The electronic device of claim 1, wherein the photodetector of the multi-functional optical sensor is configured to detect the ambient light within the space when the one or more light sources is emitting light and when the one or more light sources is not emitting light.

9. An electronic device, comprising:
a multi-functional optical sensor configured to couple to one or more light sources within a space, wherein the multi-functional optical sensor comprises:
a photodetector configured to detect occupancy of the space and ambient light within the space; and
signal conditioning circuitry configured to detect visible light communication (VLC) signals optically communicated in the space, wherein the multi-functional optical sensor is configured to detect the occupancy of the space, the ambient light within the space, and the VLC signals sequentially or concurrently.

10. A non-transitory computer-readable medium having computer executable code stored thereon, the code comprising instructions to:
cause a multi-functional optical sensor to detect light within a defined space;
cause the multi-functional optical sensor to compute an averaged phase delay of the detected light with respect to a pulsed light time of flight (TOF) measurement;
cause the multi-functional optical sensor to synchronize the pulsed light of a light source of a plurality of light sources commutatively coupled to the multi-functional optical sensor with scheduled pulse periods of the plurality of light sources, wherein the light source is in close proximately to the multi-functional sensor; and
cause the multi-functional optical sensor to measure occupancy of the defined space, ambient light within the defined space, and visible light communication (VLC) signals optically communicated within the defined space according to scheduled time slots.

11. The non-transitory computer-readable medium of claim 10, wherein the code comprises instructions to cause the multi-functional optical sensor to detect the occupancy of the defined space, the ambient light within the defined space, and the VLC signals concurrently.

12. The non-transitory computer-readable medium of claim 10, wherein the code comprises instructions to cause the multi-functional optical sensor to detect the ambient light within the defined space by averaging a luminance of the detected light over time.

13. The non-transitory computer-readable medium of claim 10, wherein the code comprises instructions to cause the multi-functional optical sensor to schedule receiving the VLC signals from the light source based on time or frequency.

14. The non-transitory computer-readable medium of claim 10, wherein the code comprises instructions to cause the multi-functional optical sensor to detect the VLC signals based at least in part on measurements of light received from a second light source of the plurality of light sources.

15. The non-transitory computer-readable medium of claim 14, wherein the code comprises instructions to cause the multi-functional optical sensor to schedule receiving the VLC signals from the light source and the second light source based on time or frequency.

16. A system, comprising:
a light source configured to illuminate an indoor space; and
an optical sensor optically coupled to the light source, wherein the optical sensor comprises:
a photodetector configured to detect occupancy of the indoor space and ambient light within the indoor space; and
signal conditioning circuitry configured to detect visible light communication (VLC) signals optically communicated in the indoor space,
wherein the photodetector of the optical sensor comprises a photosensor configured to detect occupancy of the indoor space, and ambient light within the indoor space based at least in part on measurements of light detected in one or more scheduled time slots, and wherein the signal conditioning circuitry of the optical sensor is configured to detect visible light communication (VLC) signals based at least in part on measurements of light detected in one or more scheduled time slots.

17. The system of claim 16, further comprising a second light source, and wherein the optical sensor is configured to schedule receiving the VLC signals from the light source and the second light source based on time or frequency.

18. The system of claim 16, wherein the light source comprises one or more light emitting diode (LED) devices, an LED lamp, or a combination thereof.

* * * * *